United States Patent
Surauer et al.

Patent Number: 5,906,338
Date of Patent: *May 25, 1999

[54] SUN SEARCH METHOD AND APPARATUS FOR A SATELLITE STABILIZED IN THREE AXES

[75] Inventors: Michael Surauer, Chieming; Christian Roche; Walter Fichter, both of München, all of Germany

[73] Assignee: Daimler-Benz Aerospace AG, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/620,287

[22] Filed: Mar. 22, 1996

[30] Foreign Application Priority Data

Mar. 22, 1995 [DE] Germany .......................... 195 10 371

[51] Int. Cl.$^6$ ............................ B64G 01/24; G01C 21/02
[52] U.S. Cl. .......................... 244/165; 244/171; 701/222
[58] Field of Search ..................................... 244/164, 165, 244/171; 369/455, 457; 73/178 R; 701/222, 13

[56] References Cited

U.S. PATENT DOCUMENTS

| | | | |
|---|---|---|---|
| 3,452,948 | 7/1969 | Kukel et al. .......................... | 244/165 |
| 3,741,500 | 6/1973 | Liden ................................... | 244/165 |
| 3,998,409 | 12/1976 | Pistiner ............................... | 244/165 |
| 4,071,211 | 1/1978 | Muhlfelder et al. ............... | 73/178 R |
| 4,358,076 | 11/1982 | Lange et al. ...................... | 244/171 |
| 4,767,084 | 8/1988 | Chan et al. ........................ | 244/165 |
| 5,012,992 | 5/1991 | Salvatore .......................... | 244/165 |
| 5,259,577 | 11/1993 | Achkar et al. .................... | 244/164 |
| 5,279,483 | 1/1994 | Blancke et al. .................. | 244/171 |
| 5,308,024 | 5/1994 | Stetson, Jr. ...................... | 244/171 |
| 5,311,022 | 5/1994 | Savoca ............................. | 244/171 |
| 5,558,305 | 9/1996 | Surauer et al. .................. | 244/171 |

FOREIGN PATENT DOCUMENTS

93/04923  3/1919  WIPO.

*Primary Examiner*—Lissi V. Mojica
*Attorney, Agent, or Firm*—Evenson, McKeown, Edwards & Lenahan P.L.L.C.

[57] ABSTRACT

The sun search method for a satellite stabilized in three axes according to the invention uses a sun sensor device with a visual field possibly containing gaps, and a rotational speed gyro which measures in a measuring axis that is oriented arbitrarily. A regulating law with the form $\underline{\tau} = -k\underline{GG}^T\underline{\omega}$ is used ($\underline{\tau}$=regulating torque, k=amplification factor, $\underline{G}$=directional vector of measuring axis of rotational speed gyro, $\underline{\omega}$=rotational speed vector of the satellite). A rotational wheel momentum $\underline{H}$ which is not parallel to the measuring axis, is generated with the aid of an additional flywheel device.

13 Claims, 4 Drawing Sheets

SUN SEARCH METHOD AND APPARATUS FOR A SATELLITE STABILIZED IN THREE AXES

BACKGROUND AND SUMMARY OF THE INVENTION

The invention relates to a sun search method and apparatus for a satellite which is stabilized in three axes.

International patent document WO 93/04923 A1 discloses a measuring device of this generic type for use in attitude regulation of a satellite stabilized in three axes, and a method for acquiring the sun from any initial attitude of the satellite in which the sun is not within the visual field of the sun sensors. This measuring system comprises sun sensors to determine the direction of the sun relative to a coordinate system which is integral with the satellite as well as a rotational speed gyro which measures on one axis. The visual field and/or measuring range of the sun sensors must cover the full angle of $2\pi$ in a preselectable plane of the coordinate system, and only one limited angle range less than $\pi/2$ in both directions orthogonal thereto. The permissible direction of the measuring axis of the rotational speed gyro is thus subject to a limitation that depends on the width of the visual field of the sun sensors orthogonal to the preselectable plane. The conditions specified for the angles $\alpha_1$ and $\alpha_2$ that define the visual field of the sun sensors in the preselectable plane and orthogonal thereto, and for the permissible range of angle $\beta$ measured between the measuring axis of the rotational speed gyro and the preselectable plane are defined therein as follows:

$$0 \leq \alpha_1 \leq 2\pi \tag{1a}$$

$$-\alpha_{2max} \leq \alpha_2 \leq \alpha_{2max} \tag{1b}$$

$$|\beta| \geq (\pi/2) - \alpha_{2max} \tag{1c}$$

The XZ plane of the satellite-integral coordinate system is preferred as the preselectable plane that must be completely covered by the visual field of the sun sensor system, with the Z axis being oriented to the center of the earth as the yaw axis in the case of a geostationary earth satellite for example, the X axis aligned in the direction of the orbit as the roll axis, and the Y axis, being orthogonal to the other two axes, as the pitch axis.

However, it may happen that because of the requirements imposed by other operational maneuvers, the above condition relative to the direction of the measuring axis of the rotational speed gyro can no longer be fulfilled; i.e., $$\beta_{max} \leq (\pi/2) - \alpha_{2max}, \tag{2}$$

In addition, the above requirement that the visual field of the sun sensor system in the preselectable plane must include the full angle of $2\pi$ constitutes a limitation that cannot always be allowed. Also, it is also not optimal for cost reasons, since a corresponding number of sun sensors must be provided to cover the entire angle range of $2\pi$. In addition, if one or more sun sensors should fail, gaps will occur in the visual field, resulting in the provided measurement and evaluation method and in particular the provided sun acquisition method no longer being operable. The same is true also if the all-around visual field is restricted by projecting antennas or other devices mounted on the satellite.

The goal of the present invention is to provide a method and apparatus of the species recited at the outset for sun acquisition for a satellite stabilized in three axes, that functions even when the limitations defined above regarding the sun sensor visual field as well as the direction of the measuring axis of the rotational speed gyro can no longer be maintained.

Another object is to provide a method and apparatus for sun acquisition which is usable even when the visual field of the sun sensor system has gaps in the plane and the above-mentioned measuring axis is oriented arbitrarily with respect to this visual field.

Finally, still another object of the invention is to provide a satellite stabilized in three axes which utilizes the sun search method and apparatus according to the invention.

The goal regarding the sun search method is achieved by the sun acquisition method and apparatus according to the invention, in which a flywheel device is used to generate a momentum whose corresponding momentum vector $\underline{H}$ need not be oriented parallel to the direction of the measuring axis of the rotational speed gyro. The use of a known regulating procedure (e.g., WO 93/04923 A1) is assumed in this connection, making the rotational speed component oriented parallel to the measuring axis of the rotational speed gyro equal to zero. Generation of the additional momentum means that as a result of the regulating process, merely a rotation of the satellite around the momentum axis remains. This revolution will in a great many cases suffice for the sun to appear in the visual field of the sun sensor system.

In an advantageous embodiment of the invention, the visual field of the sun sensor system continuously covers an angle of at least $\pi$ in the preselectable plane, while in another embodiment, the visual field has one or more sectors interrupted by gaps, none of which covers an angle of $\pi$.

According to the invention, a satellite can be stabilized in three axes without the limitations recited at the outset regarding its sun sensor system as well as the direction of the measuring axis of its rotational speed gyro, measuring on one axis. In other words there is no longer all-around visibility of the sun sensor system in the preselectable plane, and the single measuring axis of the rotational speed gyro can be oriented as desired. The important feature is the addition of a flywheel device capable of generating momentum components around all three coordinate axes. Such a satellite with only one uniaxially measuring rotational speed gyro when the sun sensor visual field is sharply restricted for rotational speed measurement, could not have been designed earlier because of the problem that a sun search must be commenced from an unknown initial attitude. The problem could be solved in the past only when a rotational speed gyro was available that measured on three axes and, especially in the case of a redundant design, was correspondingly expensive and delicate. In contrast, in the method and apparatus according to the invention, a satellite uses a uniaxially measuring rotational speed gyro for the essential sun search maneuver, which is made possible by the flywheel device that is provided.

Objects, advantages and novel features of the present invention will become apparent from the following detailed description of the invention when considered in conjunction with the accompanying drawings.

DETAILED DESCRIPTION OF THE DRAWINGS

Figure 1:
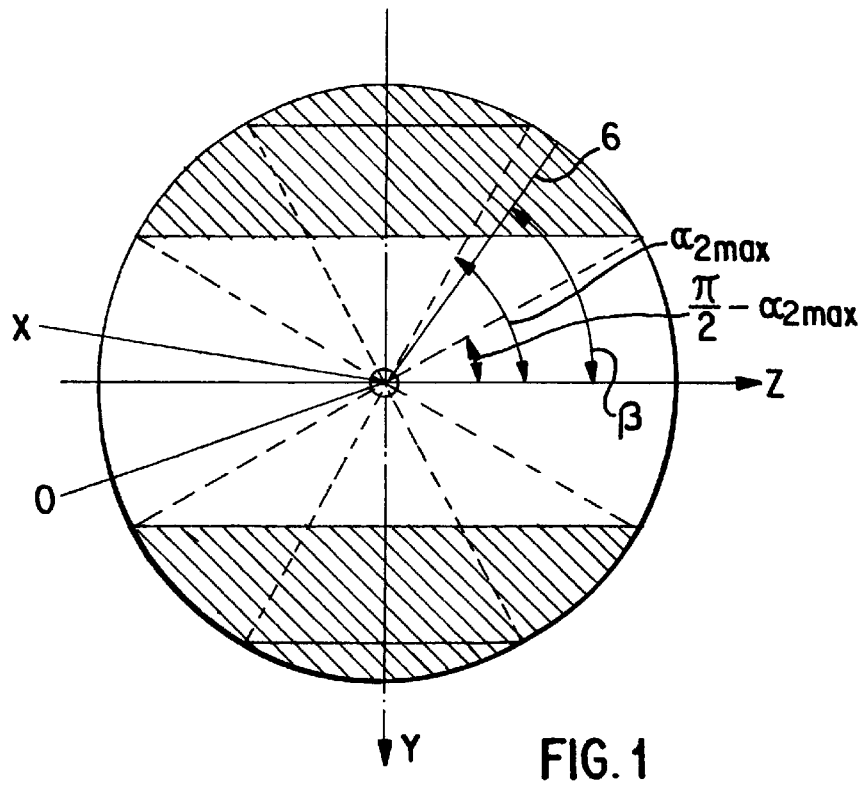
FIG. 1 is a diagrammatic illustration of the visual field of a sun sensor in a prior art system.

FIG. 1 shows the position and size of the required visual field of the sun sensor system according to the prior art, as well as the permissible alignment of the measuring axis (directional vector $\underline{G}$) of the uniaxially measuring gyro in a satellite-integral coordinate system XYZ. The sun sensor system has all-around visibility ($0 \leq \alpha_1 \leq 2\pi$) in the XZ plane, and the visual field is limited to $\pm\alpha_{2max}$ in both directions orthogonal thereto, so that an area in the shape of a double cone exists around the positive and negative Y axis, which the sun sensor system does not include. Only the two areas shown shaded are permitted for the directional vector $\underline{G}$ of the rotational speed gyro, and they are characterized by the requirement:

$$|\beta| \geq (\pi/2) - \alpha_{2max}. \tag{1c}$$

Here $\beta$ represents the angle between the XZ plane and the directional vector $\underline{G}$. This requirement cannot always be met, however, because of the requirements imposed by other operational maneuvers. In this case the prior art method provided for sun searching likewise can no longer be used.

This is also true when the sun sensor system no longer has all-around visibility, as for example in the event of failure of a single sun sensor (which, when reliably functioning covers a portion, for example one-third, of the 360° visual field), or when a number of individual sun sensors sufficient for all-around visibility must be omitted for cost reasons.

A system in which the above conditions are violated occurs for example when the sun sensor visual field covers an angle that is only slightly greater than $\pi$ in the XZ plane of the satellite-integral coordinate system, and the direction vector $\underline{G}$ of the uniaxially measuring rotational speed gyro likewise lies in the XZ plane, preferably in the middle of this visual field. Such an arrangement is shown schematically in FIG. 2, in which the visual field in the XZ plane is indicated by shading and is centered around the directional vector $\underline{G}$ of the measuring axis of the rotational speed gyro. In particular, directional vector $\underline{G}$ can also coincide with the X axis. The visual field should include at least the two vectors $\pm\underline{e}_R$ defined as follows:

$$e_R = \tilde{G}\underline{e}_Y \tag{3}$$

where $\underline{e}_Y$ is the unity vector in the direction of the Y axis. Of course, the visual field of the sun sensor system so defined also has a certain portion orthogonal to the XZ plane, ±30° for example, with these values permitted to decrease somewhat toward the edge.

A satellite stabilized in three axes with such a special system for the sun sensor visual field as well as the measuring axis of the rotational speed gyro has the usual torque generating device for the purpose of attitude regulation, such device generally having three pairs of attitude regulating jets, each of which can generate positive and negative momentum around one of the coordinate axes. Instead of attitude regulating jets, other devices can be provided for generating momentum, a system of magnetic coils when an external magnetic field is present for example.

The system according to the present invention is additionally provided with a torque generating device able to generate momentum components in all three coordinate directions. Preferably this is a flywheel device which in the simplest case consists of a single flywheel pivotable in any desired direction. Generally, however, at least three separate flywheels are provided whose rotational axes need not all lie in the same plane. By a suitable adjustment of the rotational speed and rotational direction of these flywheels, it is then possible to produce a resultant momentum (momentum vector H) with the desired value and in the desired direction.

Figure 3:
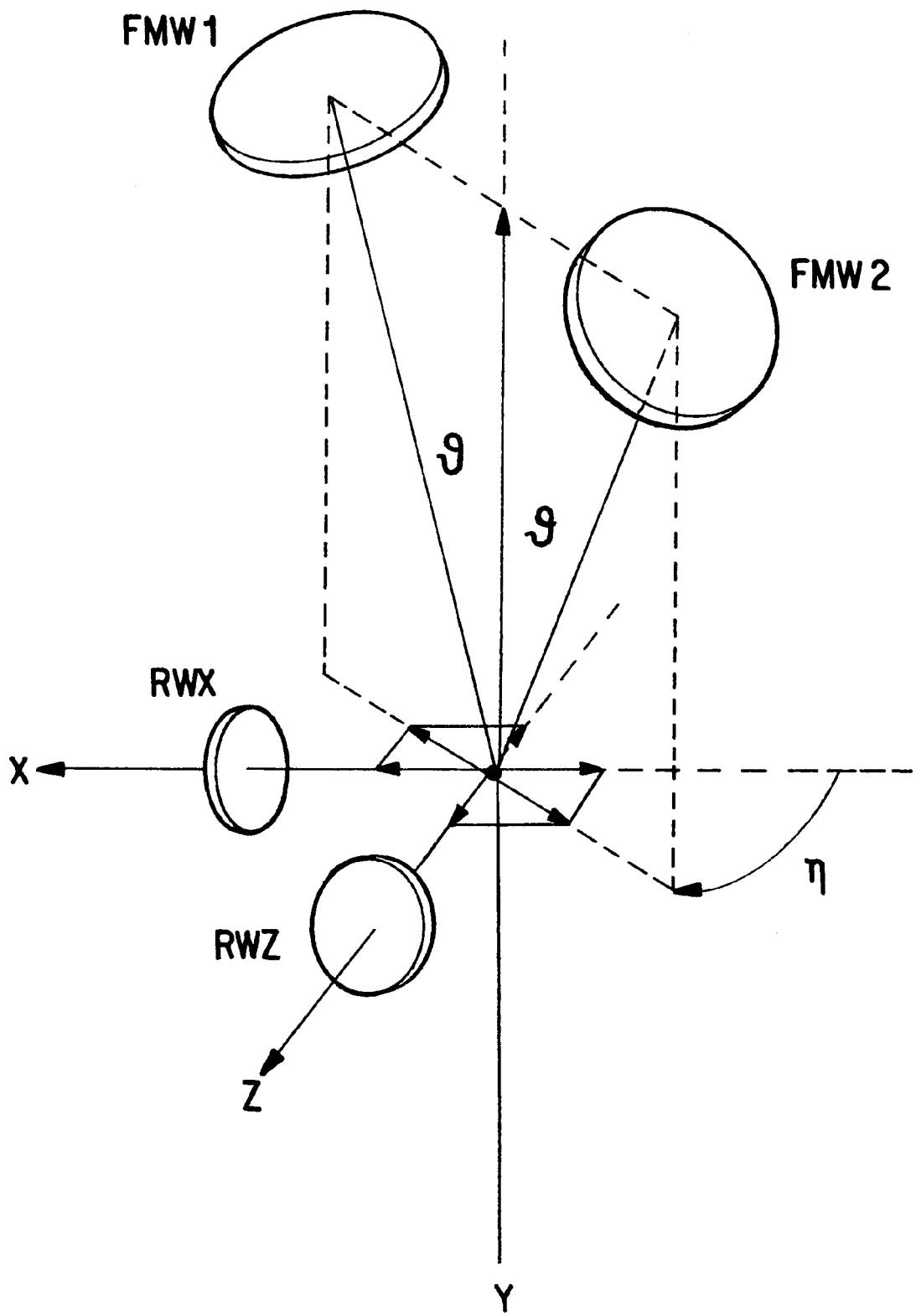
FIG. 3 is a schematic depiction of a flywheel arrangement according to the invention.

A preferred embodiment of such a flywheel device is shown in FIG. 3, in which two reaction wheels RWX and RWZ, whose rotational axes coincide with the X and Z axes, respectively, as well as two twist wheels FMW1 and FMW2 whose rotational axes each enclose the same angle $\delta$ relative to the negative Y axis, but with opposite signs, and are coplanar with this axis. The corresponding plane forms angle $\eta$ with the negative X axis. Typical numerical values for this angle are:

$$\eta = 45°$$

$$\delta = 10°$$

Such a system of flywheels can also be defined as follows independently of the coordinate axes: Two twist wheels have rotational axes that enclose an acute angle, while the two reaction wheels have their rotational axes mounted orthogonally with respect to one another. The two rotational axis planes spanned by the two rotational axes are orthogonal to one another, and the bisectors of the angles spanned by the two wheel pairs respectively lie in a plane oriented orthogonally to the two rotational axis planes. Twist wheels are generally designed to deliver a high momentum in one direction and to maintain it, while reaction wheels can generate a relatively small momentum in both rotational directions. The flywheel device in FIG. 3 is preferably designed to deliver a momentum vector $\underline{H}$ in the direction of the Y axis, so that any deviations that occur in the other two coordinate directions can be easily adjusted. It is designed redundantly so that even if one of the four flywheels should fail, it is still possible to generate a momentum vector H approximately not only in the direction of the negative Y axis but in any other direction as well.

To perform the sun search with such a sensor system, when the rotational speed is known with a certain degree of accuracy (for example after the satellite separates from the carrier rocket), rotation is initially slowed down under control in a known manner. For this purpose, with the aid of the above-mentioned torque generating device (for example the attitude regulating jets), a torque $\underline{\tau}$ is created that is oriented opposite to the rotational speed vector $\underline{\omega}$ that acts for the following space of time $\Delta t$:

$$\Delta t = |I\underline{\omega}|/|\tau| \tag{4}$$

where I is the inertial sensor of the satellite. During this process, the flywheels of the flywheel system are at rest. Consequently, a small unknown residual rotational speed $\underline{\omega}_R$ will generally remain, to be eliminated in the following step.

The invention addresses this point, but it can also be used without the method step described above. A constant momentum vector $\underline{H}$ is set with the aid of the flywheel device. (The only requirement initially applicable to the flywheel device is that it not be oriented parallel to direction vector $\underline{G}$ of the measuring axis of the rotational gyro.) As already mentioned, a regulator is also necessary which outputs positioning signals for the torque generating device based on the measuring signals from the rotational speed gyro to create regulating torque. Such regulators are found in the attitude regulating device of every conventional satellite. Accordingly, a system equation is obtained as follows, neglecting the Euler term:

$$I\dot{\omega}(\tilde{H}-k\underline{G}\underline{G}^T)\omega \quad (5)$$

where $\tilde{H}$ is the cross product matrix of momentum vector $\underline{H}$, k is an amplification factor, $\underline{G}^T$ is the vector transposed to $\underline{G}$, and $\dot{\omega}$ is the time derivative of rotational speed vector $\underline{\omega}$. The second term on the right-hand side of this equation corresponds to the regulating law already known from International patent document WO 93/04923 A1, which damps the component of the rotational speed vector $\omega$ parallel to directional vector $\underline{G}$. The first term, which depends on momentum vector $\underline{H}$, causes a coupling of the rotational speed component oriented orthogonally to H with measuring axis $\underline{G}$. Rotational energy is constantly drawn from the rotation around the component of rotational speed vector $\underline{\omega}$ oriented orthogonally to directional vector $\underline{G}$ and orthogonally to momentum vector $\underline{H}$ and coupled into the directional axis, where it is then subject to damping by the second term. This occurs with the aid of the attitude regulating system, for example by actuating the attitude regulating jets to generate regulating torque $\underline{\tau}$.

The component of the rotational speed vector $\underline{\omega}$ oriented orthogonally to directional vector $\underline{G}$ is damped when momentum vector $\underline{H}$ is set orthogonal to $\underline{G}$. Then only a small rotation around $\underline{H}$ remains as a result of the regulating process, which can also be zero.

In general, the above system equation can also be formulated as follows with the aid of a system matrix A:

$$\dot{\underline{\omega}} = A\underline{\omega}. \quad (5a)$$

The choice of vectors $\underline{H}$ and $\underline{G}$ determines the eigenvalues of the system matrix A and hence the damping behavior. If these vectors are chosen other than according to the guideline that $\underline{G}$ and $\underline{H}$ should be orthogonal to one another, the rotational speed components are in fact regulated to zero around all three coordinate axes, but with highly oscillatory transient response, which is normally undesirable.

Figure 2:
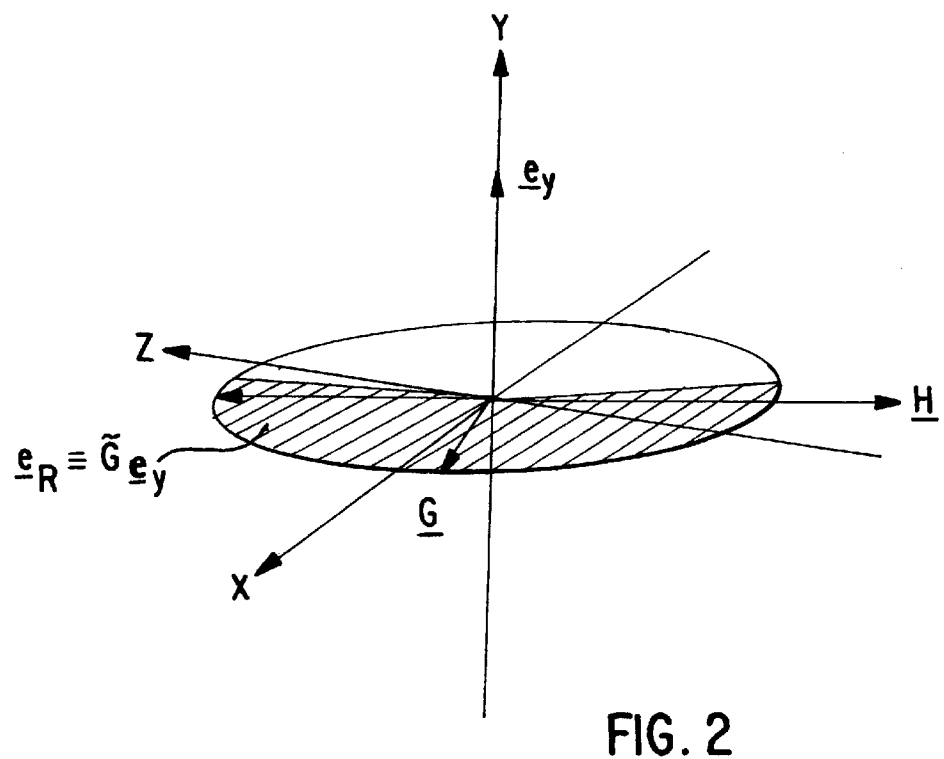
FIG. 2 is a diagrammatic illustration of the visual field in the XZ plane of a system which fails to satisfy the requirements according to the prior art.

The case that is especially relevant in practice, as shown in FIG. 2 as well, is that in which $\underline{G}$ and $\underline{H}$ lie in the XZ plane and are oriented orthogonally to one another. With this configuration, the rotational speed components along directional axis $\underline{G}$ and the $\underline{Y}$ axis of the satellite-integral coordinate system are completely damped, so that only a rotation around momentum vector H remains, as mentioned above.

If the momentum vector $\underline{H}$ is oriented as shown in FIG. 2, namely at the edge of the visual field of the sun sensor system, which in all events covers at least angle π and then also includes vector $\underline{H}$, a residual rotation of the satellite by $\underline{H}$ sooner or later necessarily leads to acquisition of the sun. If this residual speed is very low or even equal to zero, however, a search maneuver that consists in rotation around an axis $\underline{e}_R$ is launched by actuating the torque generating device, in other words the attitude regulating jets for example. Such rotation occurs in the XZ plane within the visual field of the sun sensor system, sufficiently close to the edge that this also applies to the vector $-\underline{e}_R$. Thus, $\underline{e}_R = \underline{H}$ can be chosen as the preferred axis. This constitutes the optimal case for use. The duration of the required momentum pulses is estimated on the basis of the residual speed that remains following regulating damping using the above regulating law.

Figure 4:
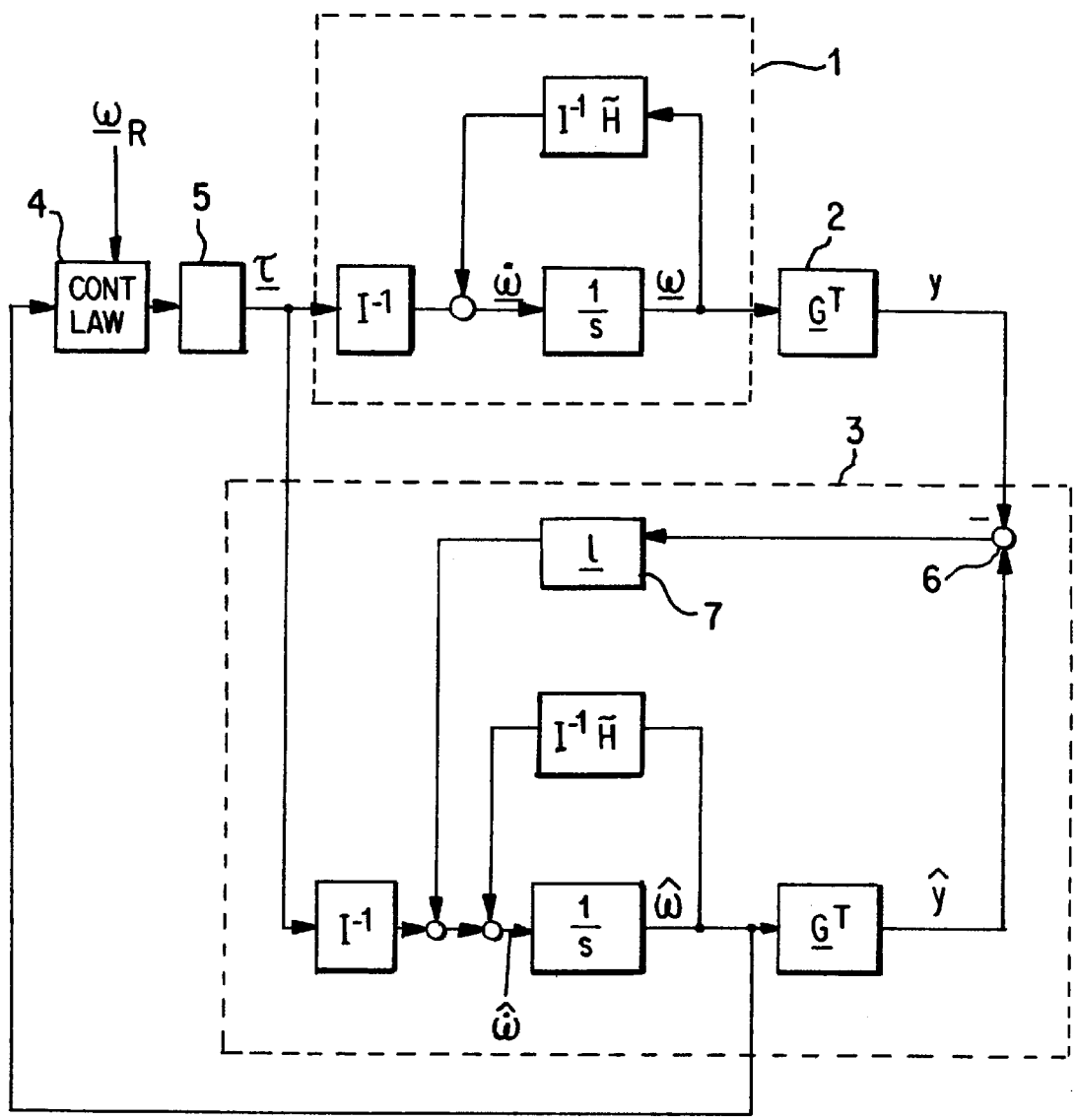
FIG. 4 is a block diagram of an observer arrangement for generating positioning signals to perform the process according to the invention.

When the visual field of the sun sensor system in the XZ plane consists of one or more partial sectors separated from one another by gaps, none of which sectors covers a comprehensive angle range of at least π, after the method step according to the invention is performed (i.e., regulated damping using the above regulating law), a different final search maneuver is employed. This maneuver consists of a rotation of the satellite around the rotational axis or successive rotations around a plurality of rotational axes being commanded after taking into account the orientation and size of the partial sectors, the direction of such rotation ensuring that the sun eventually appears in one of the partial sectors. Such maneuvers are known for example from German patent document DE 27 49 868 C3 or the article "The Attitude and Orbit Control Subsystem of the TV-SAT/TDFI Spacecraft," by H. Bittner et al., IFAC Symposium on Automatic Control in Space, 1982, Pages 83 to 102. In that method, however, a rotational speed gyro that measures on three axes or an equivalent measuring device is needed. In order to take into account the fact that in the present case a rotational speed gyro that measures on only one axis is available, a observer is used to estimate the unknown component of the rotational speed vector $\underline{\omega}$ which is oriented orthogonally to directional vector $\underline{G}$ of the measuring axis. This can have the structure shown in FIG. 4 for example.

The dynamics of the real satellite are shown in dashed box 1 and form the equation $$\dot{\underline{\omega}} = I^{-1}\tilde{H}\underline{\omega} + I^{-1}\underline{\tau} \quad (6)$$

where $\underline{\tau}$ is the control torque supplied to the satellite. An output value y is determined by rotational speed gyro 2 that measures on one axis, said value being proportional to the rotational speed component orthogonal to directional vector $\underline{G}$ of the measuring axis of the rotational speed gyro:

$$y \sim \underline{G}^T\underline{\omega}. \quad (7)$$

Both a signal that corresponds to regulating momentum $\underline{\tau}$ and the output signal y are supplied to observer 3 that simulates the satellite dynamics in detail. The observer generates a signal $\hat{y}$ from which the output signal y of the real satellite is subtracted in a summing point 6. In the observer, the estimated values $\hat{\underline{\omega}}$ and their time derivative are formed as intermediate values. The value s usually represents the Laplace or differential operator. In addition, inertial matrix I of the satellite is used.

In the system shown, observer 3 can be a hardware circuit or simply an algorithm in the on-board computer of the satellite.

The differential value formed in summing point 6 can optionally pass through an amplifier 7 in which a vectorial amplification factor $\underline{l}$ with $\underline{l}^T = (l_1, l_2, l_3)$ is used. The estimated value $\hat{\underline{\omega}}$ formed in the observer which contains three estimated components in all three coordinate directions is sent to a regulator 4 that generates positioning signals for a downstream torque generating device 5 in such fashion that the following regulating law is implemented:

$$\underline{\tau} = k_D(\underline{\omega}_R - \hat{\underline{\omega}}). \quad (8)$$

Hence such regulation causes estimated value $\hat{\underline{\omega}}$ to be corrected to reference vector $\underline{\omega}_R$, where $\underline{\omega}_R$ is the rotational speed vector to be achieved for searching for the sun. This vector, taking into account the size and orientation of the visual fields of the individual sun sensors, must be designed and possibly changed continuously in a plurality of successive steps to assure that the sun finally appears in one of the partial sectors.

It is important to keep in mind in this connection that even during this final search maneuver using the flywheel device according to the invention, a momentum vector $\underline{H}$ must be applied, oriented in such fashion that the observability matrix $Q_B$ assigned to the observer has a rank of 3. As is known, this matrix is given by:

$$Q_B = \begin{bmatrix} \underline{G}^T \\ \underline{G}^T I^{-1} \tilde{H} \\ \underline{G}^T (I^{-1} \tilde{H})^2 \end{bmatrix}. \quad (9)$$

Observability exists as soon as the three line vectors of this matrix are linearly independent of one another. This can be accomplished e.g., by adjusting momentum vector $\underline{H}$ in such fashion that an angle of 45° is spanned between $\underline{H}$ and $\underline{G}$. As a result, all three motion axes are coupled with one another.

The prerequisite for the use of this search method is that the satellite, following completion of regulator damping, rotates only at a speed so low that the following inequality is fulfilled:

$$|I\underline{\omega}| << |\underline{H}|. \quad (10)$$

Then the nonlinear influence of Euler term $\tilde{\underline{\omega}}\, I\underline{\omega}$ is negligible in the following equation of motion:

$$\dot{\underline{\omega}} + \tilde{\underline{\omega}}(\underline{\omega} + H) = \tau \quad (11)$$

and the above-mentioned observer equation results. This assumption however is always made after completion of regulated damping according to the invention. In the case of a spherical mass distribution in the satellite, the Euler term $\tilde{\underline{\omega}}\, I\underline{\omega}$ disappears even when the rotational speeds $|\underline{\omega}|$ are high.

Figure 5:
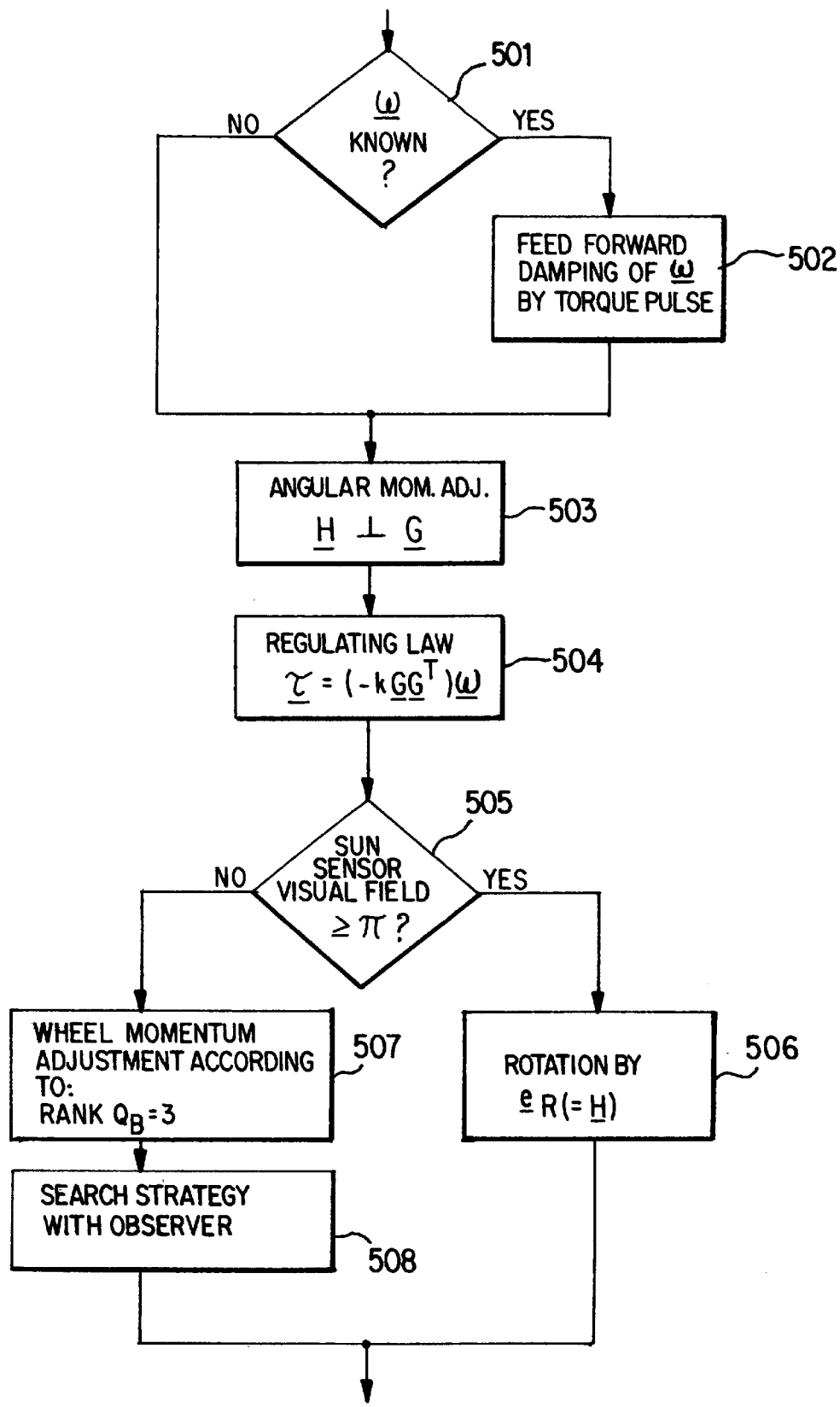
FIG. 5 is a flow diagram which illustrates the steps of the process for different sun sensor configuration and initial rates according to the invention.

Finally, for different cases (sun sensor field of view, initial rates) FIG. 5 shows in a comprehensive representation the individual partial steps of the search strategy for sun seeking according to the invention. If the initial rate is approximately known then in step 502 a forward damping of $\underline{\omega}$ is performed by means of torque pulses. If on the other hand $\underline{\omega}$ is not known, or after the damping in step 502 if applicable, a wheel angular momentum adjustment is performed in step 503 in order to adjust $\underline{H}$ and $\underline{G}$ so that they are orthogonal to each other. Thereafter, in step 504 the control law $\tau = -k \underline{GG}^T \underline{\omega}$ is applied. Next, if the sun sensor visual field is at least equal to an angle of $\pi$ radians, then the satellite is rotated in step 506 according to the vector equation $\underline{e}_R (=H)$. If, on the other hand, the sun sensor configuration is such that the sun sensor visual field is smaller than $\pi$, then in step 507, an adjustment of the wheel angular momentum is performed according to Rank $Q_B=3$. Finally in step 508 a search strategy of prior art is performed based on the angular rate estimates delivered by the observer.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Method for sun seeking for a satellite stabilized in three axes, by means of a system having a sun sensor device whose visual field covers one or more partial sectors, separated from one another by gaps, of a preselectable plane of a satellite-integral orthogonal three-axis coordinate system and an area orthogonal to this plane;

a rotational speed gyro which measures uniaxially with a measuring axis oriented arbitrarily;

a first torque generating device other than a flywheel device, for generating torque around all three coordinate axes; and a regulator which, based on the measuring signals of the rotational speed gyro for purposes of generating regulating torque, outputs positioning signals for the first torque generating device, based on regulating process of the following form: $\underline{\tau} = -k\underline{GG}^T\underline{\omega}$ and where $\underline{\tau}$ is a regulating torque, k is an amplification factor, $\underline{G}$ is the directional vector of the measuring axis with $|\underline{G}|=1$, $\underline{G}^T$ being the vector transposed to $\underline{G}$, and $\underline{\omega}$ is the rotational speed vector of the satellite, said method comprising:

providing a second torque generating device in the form of a flywheel arrangement on said satellite; and said flywheel arrangement generating a rotation wheel momentum having a momentum vector $\underline{H}$ that is not parallel to the direction of the measuring axis.

2. Method according to claim 1 wherein:

said sun sensor device has a visual field which covers an angle range of at least $\pi$ continuously within the preselectable plane; and the momentum vector H is generated in a direction which is oriented orthogonally to directional vector $\underline{G}$ of the measuring axis.

3. Method according to claim 1 further comprising:

adjusting orientation of momentum vector $\underline{H}$ so that both $\underline{H}$ and also $-\underline{H}$, starting from the origin of the coordinates of the satellite-integral coordinate system, lie within the visual field of the sun sensor system.

4. Method according to claim 3 further comprising:

in the event that rotation of the satellite around the direction of momentum vector $\underline{H}$ after application of the regulating process is small or zero, causing a rotation around a vector $\underline{e}_R$ which is chosen so that it lies, together with a vector $-\underline{e}_R$, in the preselectable plane within the visual field of the sun sensor system.

5. Method according to claim 4 wherein vector $\underline{e}_R$ is collinear with momentum vector $\underline{H}$.

6. Method according to claim 1 wherein:

sun sensor device has a visual field within the preselectable plane that does not have a partial sector that continuously covers an angle range of at least $\pi$;

and momentum vector $\underline{H}$ is oriented in such fashion that matrix:

$$Q_B = \begin{bmatrix} \underline{G}^T \\ \underline{G}^T I^{-1} \tilde{H} \\ \underline{G}^T (I^{-1} \tilde{H})^2 \end{bmatrix}$$

has a rank of 3.

7. Method according to claim 6 wherein momentum vector $\underline{H}$ encloses an angle of 45° with measuring axis $\underline{G}$.

8. Method according to claim 6 further comprising:

causing at least a rotation of the satellite around at least one rotational axis, taking into account the orientation and value of the partial sectors of the visual field of the sun sensor system, the direction of such at least one rotation ensuring that the sun will eventually appear in one of the partial sectors;

using an observer to estimate an unknown component of the rotational speed vector $\underline{\omega}$ oriented orthogonally to measuring axis (R).

9. A sun acquisition device for a satellite which is stabilized in three axes, comprising:

a sun sensor system having a visual field that covers one or more partial sectors separated from one another by gaps within a preselectable plane in a satellite-integral, three-axis, orthogonal system of coordinates;

a uniaxially measuring rotational speed gyro having an arbitrarily oriented measuring axis;

a torque generating device that generates torques around all three axes;

a regulator which, based on the measuring signals of the rotational speed gyro for purposes of generating regulating torque, outputs positioning signals for the torque generating device, based on regulating process of the following form: $\tau = -kGG^T\omega$, where $\tau$ is a regulating torque, k is an amplification factor, G is the directional vector of the measuring axis with $|G|=1$, $G^T$ being the vector transposed to G, and $\omega$ is the rotational speed vector of the satellite; and a flywheel arrangement that is able to generate momentum components around all three coordinate axes;

said flywheel arrangement generating a rotation wheel momentum having a momentum vector H that is not parallel to the direction of the measure axis.

10. Satellite according to claim 9 wherein the flywheel arrangement comprises at least three flywheels with rotational axes that do not all lie in a single plane.

11. Satellite according to claim 10 further comprising:

least one reaction wheel; and one twist wheel.

12. Satellite according to claim 11 further comprising:

at least two twist wheels with rotational axes enclosing an acute angle; and at least two reaction wheels arranged orthogonally to one another with respect to their rotational axes;

wherein the two rotational axis planes spanned by two rotational axes are orthogonal to one another; and bisectors of the angles spanned by the two wheel pairs lying in a plane are oriented orthogonally to the two rotational axis planes.

13. A method for sun seeking for a satellite which is stabilized about plural axes by means of a sun sensor whose visual field covers at least two partial sectors separated from one another by gaps, at least a first torque generating device for generating torques around said plural axes, and a rotational speed gyro which measures rotational speed about an arbitrarily selected measuring axis, said method comprising:

providing a second torque generating device in the form of a flywheel arrangement on said satellite; and said flywheel arrangement generating a rotational wheel momentum having a momentum vector $\underline{H}$ that is not parallel to measuring axis of said rotational speed gyro, whereby said satellite rotates about an axis of the momentum vector $\underline{H}$.

* * * * *